United States Patent [19]

Schur et al.

[11] 4,385,246

[45] * May 24, 1983

[54] APPARATUS FOR PRODUCING ELECTRICAL ENERGY

[75] Inventors: Paul E. Schur, 74 Vaneck Dr., New Rochelle, N.Y. 10801; Andrew I. Abolafia, Forest Hills, N.Y.

[73] Assignee: Paul E. Schur, Bronx, N.Y.

[*] Notice: The portion of the term of this patent subsequent to Dec. 9, 1997, has been disclaimed.

[21] Appl. No.: 111,838

[22] Filed: Jan. 14, 1980

Related U.S. Application Data

[63] Continuation of Ser. No. 719,978, Sep. 2, 1976, Pat. No. 4,237,391.

[51] Int. Cl.³ .............................................. H02K 11/00
[52] U.S. Cl. ...................................... 310/10; 310/68 R; 322/49
[58] Field of Search .................. 310/10, 40, 52, 168, 310/169, 170, 171, 191, 209, 154, 157, 113, 68; 322/49

[56] References Cited

U.S. PATENT DOCUMENTS

| | | | |
|---|---|---|---|
| 3,336,489 | 8/1967 | Volger | 310/40 |
| 3,393,332 | 7/1968 | Fakan | 310/10 |
| 3,402,307 | 9/1968 | Pearl | 310/10 |
| 3,427,482 | 2/1969 | Massar | 310/10 |
| 3,443,128 | 5/1969 | Fakan | 310/10 |
| 3,467,481 | 9/1969 | Migot | 310/10 |
| 3,469,121 | 9/1969 | Smith | 310/10 |
| 3,478,232 | 11/1969 | Eder | 310/10 |
| 3,560,773 | 2/1971 | McFarlane | 310/52 |
| 3,564,307 | 2/1971 | Kawabe | 310/10 |
| 3,673,444 | 6/1972 | Kawabe | 310/10 |

OTHER PUBLICATIONS

Buchold "Applications of Superconductivity", Scientific American, vol. 202, No. 3, 1969, pp. 74–82.
Volger "Dynamo for Generating Persistent Current in a Superconducting Circuit", P.T.R., vol. 25, 1963–1964, No. 1, pp. 16–19.
Appleton "Motors, Generators and Flux Pumps", Cryogenics, 6/1969, pp. 147–157.

*Primary Examiner*—R. Skudy
*Attorney, Agent, or Firm*—Finnegan, Henderson, Farabow, Garrett & Dunner

[57] ABSTRACT

An electrical generator comprises a stationary permanent magnet for establishing a magnetic field, one or more sensing coils responsive to the magnetic field, and a diamagnetic blocking element movable between the magnet and the sensing coils for periodically interrupting the magnetic field to produce electrical energy in the coils. A preferred embodiment includes a pair of semi-circular coils arranged side-by-side in the magnetic field and a rotatable blocking disc interposed between the magnet and the coils. The disc includes a semi-circular portion of superconductive material rendered impermeable to the magnetic field at temperatures near absolute zero and a semi-circular portion of magnetically inert material to alternately block and pass the magnetic field to the coils upon rotation of the disc.

3 Claims, 5 Drawing Figures

APPARATUS FOR PRODUCING ELECTRICAL ENERGY

This is a continuation, of application Ser. No. 719,978, filed Sept. 2, 1976, now U.S. Pat. No. 4,237,391.

The present invention relates to an apparatus for producing electrical energy and, more particularly, to an electrical generator for transforming a stationary magnetic field into useful electrical energy.

It has become increasingly important in recent years to develop sources of electrical energy which operate with increased efficiency. The rapidly inflating cost of fuel, e.g., oil and gasoline, has made the operation of generators utilizing these fuels increasingly expensive. In addition, energy consumers have become more conscious of the finite limits of our world-wide supply of energy. As a result, it has become imperative to find more efficient alternatives to the conventional sources of electrical energy previously used.

The present invention contemplates the use of a magnetic blocking device, e.g., an element which exhibits the property of diamagnetism, to periodically interrupt a magnetic field to generate electrical energy in a sensing device responsive to changes in the magnetic field. Blocking devices, such as superconductive material or plasma (ionized gas), both of which exhibit diamagnetism, are contemplated as suitable mechanisms for control of the magnetic field. The invention provides for efficient transformation of the energy of the magnetic field into an electrical output which can be used in place of conventional sources of electrical energy.

A preferred embodiment of the present invention relies on principles of magnetism and cryogenics to achieve an electrical generator of enhanced efficiency in comparison with prior art devices. It is well known that, at temperatures near absolute zero (0° K.), certain materials, e.g., niobium, become superconductive and offer little or no resistance to the flow of electrical current. Two (2) types of superconductive materials have been recognized to exist. Type I or soft superconductors, usually very pure metals, e.g., niobium, mercury, lead, aluminum, vanadium, lanthanum and technetium, when maintained near absolute zero, have the property of perfect diamagnetism or negative susceptibility. This condition is represented by the following equation:

$$X = -M/B$$

where X represents susceptibility, M is the magnetic moment per unit volume (dynes-cm/cm$^3$), and B is the macroscopic field intensity (gauss or flux/cm$^2$). In addition, Type I superconductive materials exhibit the Meissner effect, i.e., the tendency of magnetic flux lines to bounce off rather than penetrate the material. Further, Type I superconductors generally exhibit a low critical field. Type II or hard superconductors are alloys which exhibit superconductivity at temperatures near absolute zero but do not exhibit perfect diamagnetism or the Meissner effect. In addition, the Type II superconductive materials have a higher critical field than Type I superconductors.

With respect to the critical field property of superconductive materials, a Type I or soft superconductor generally has a critical field $H_c$ (transition panel) at which the material abruptly becomes a normal conductor. At field strengths below $H_c$, the material exhibits the Meissner effect, which is essentially perfect diamagnetism, and exhibits no hysteresis. Type II or hard superconductors have a number of transition points, i.e., $H_1$, $H_c$, $H_2$ and $H_3$. Transition points $H_c$ and $H_3$ are relatively unimportant for purposes of the present invention. At $H_1$, which is very low (usually much lower than $H_c$ for niobium), the Type II material behaves as a soft superconductor. Between $H_1$ and $H_2$, the Type II material is in its vortex state. Although the Type II material is still superconductive, it is threaded by areas of normal conductivity. The Type II material exhibits a large amount of hysteresis and is not perfectly diamagnetic.

In the preferred embodiment of the present invention, the diamagnetic property and Meissner effect of soft (Type I) superconductive material are exploited to provide a generator for producing electrical energy from a magnetic field. A soft superconductive element maintained as a temperature near absolute zero is employed to periodically interrupt the magnetic field, e.g., a uniform field established by a stationary permanent magnet, to generate electrical energy in a device, e.g., a coil, responsive to changes in the magnetic field. The superconductive element is located at position in the magnetic field slightly below its critical field strength $H_c$. Since, in contrast to a conventional conductor, no work is required to move the soft superconductive material across a uniform magnetic field less than the critical field $H_c$ due to the absence of hysteresis, the apparatus operates at a high level of efficiency.

In accordance with the principles of the invention, an apparatus for producing electrical energy comprises a permanent magnet for establishing a magnetic field, sensing means responsive to the magnetic field established by the permanent magnet for producing electrical energy in response to changes in the magnetic field, and blocking means interposed between the permanent magnet and the sensing means for periodically interrupting the magnetic field from the permanent magnet. For example, the blocking means comprises a magnetic flux blocking device of diamagnetic material mounted for movement between the permanent magnet and sensing means for alternately blocking and passing the magnetic flux from the permanent magnet to the sensing means. In a preferred embodiment, the sensing means comprises a coil located within the magnetic field established by the permanent magnet. The blocking means of the preferred embodiment comprises a rotatable blocking element of soft superconductive material rendered impermeable to the magnetic field at temperatures near absolute zero and adapted to alternately block and pass the magnetic field from the permanent magnet upon rotation of the blocking element to produce electrical energy in the coil.

The invention is specifically embodied in a generator unit adapted to be immersed in liquid helium or other low temperature medium. The generator unit includes a magnet and a pair of sensing coils mounted side-by-side within the magnetic flux of the magnet. A magnetic field control device in the form of a rotatable disc including a semi-circular portion of soft superconductive material rendered impermeable to the magnetic flux at temperatures near absolute zero and a semi-circular portion of magnetically inert material is interposed between the magnet and sensing coils. Upon rotation of the disc and superconductive blocking element, each coil is alternately shielded from and exposed to the magnetic flux to produce electrical signals in the coils.

The accompanying drawings illustrate a preferred embodiment of the invention and, together with the description, serve to explain the principles of the invention.

Figure 1:
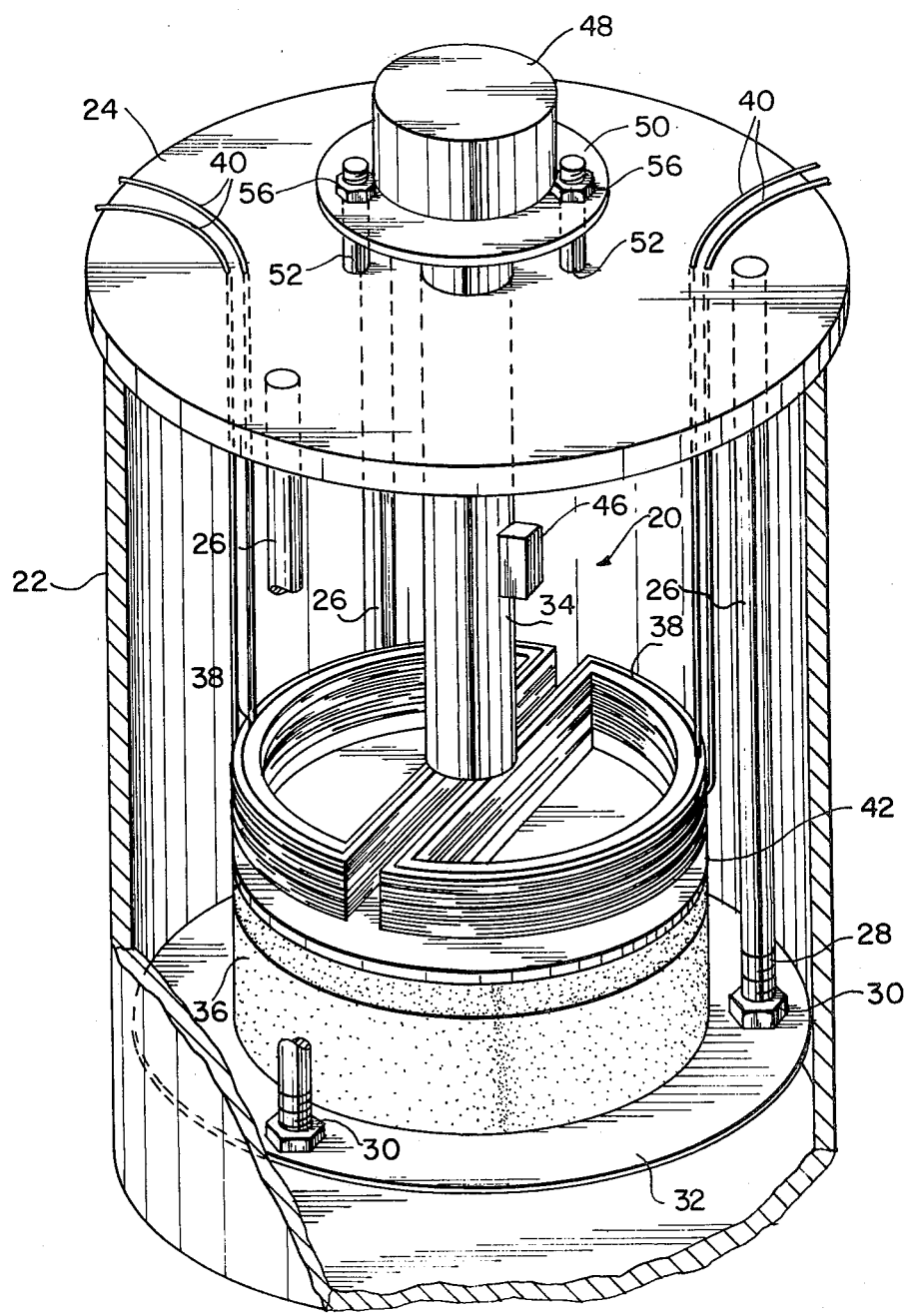
FIG. 1 is a perspective view, partially in section, of a superconductive electrical generator constructed in accordance with the principles of the present invention.
Figure 2:
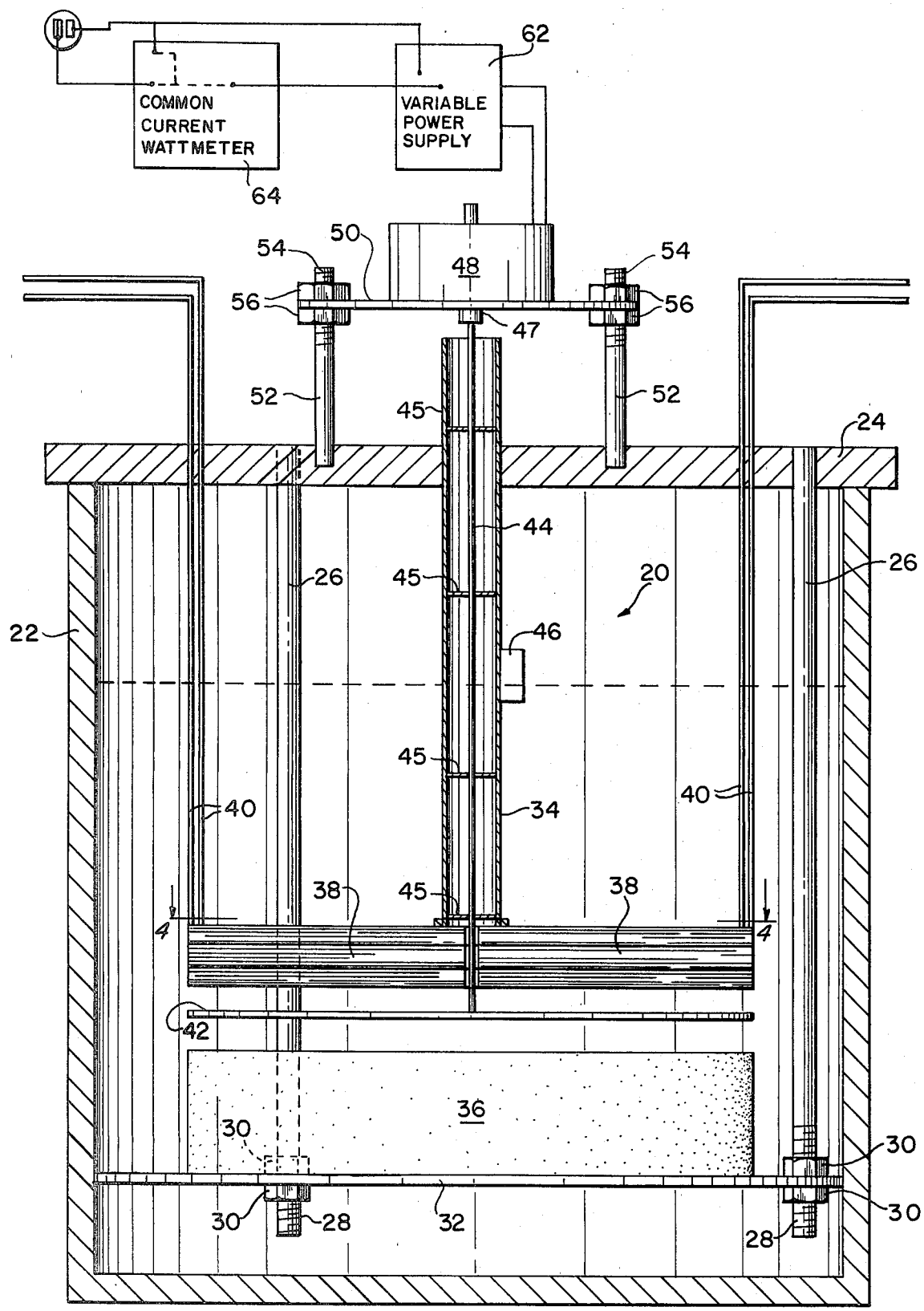
FIG. 2 is a vertical section of the apparatus of FIG. 1 illustrating the arrangement of a permanent magnet, a pair of sensing coils, and a rotatable, superconductive blocking element for interrupting the magnetic field from the magnet to the coils and a motor control arrangement to rotate the blocking element.

Referring to FIG. 1, the present invention is embodied as a superconductive electrical generator unit, generally 20, adapted to be immersed in a low temperature vessel, e.g., a Dewar tank 22, to maintain the generator unit at temperatures near absolute zero (0° K.). Generator unit 20 includes a circular plate or cover 24 provided with a plurality of support rods 26 extending downwardly from the circular plate. Preferably, a set of three (3) equidistantly spaced support rods 26 is provided adjacent to the periphery of plate 24. Each support rod includes a threaded portion 28 at its lower end for receiving a pair of nuts 30 (FIG. 2). A platform 32, consisting of a circular base, is secured to support rod 26 by nuts 30. In the preferred embodiment, the base is provided with spaced holes (not shown) to reduce its mass. Circular plate 24 supports a rigid tube 34 located at the center of the plate and extending axially downward.

In the apparatus of the present invention, a permanent magnet is provided for generating a magnetic field. Referring to FIGS. 1 and 2, generator unit 20 includes a permanent magnet 36 mounted on platform 32 beneath the lower end of tube 34. The magnet preferably consists of a solid cylindrical piece of permanently magnetized material. Alternatively a magnet assembly consisting of a plurality of smaller permanent magnets is arranged in a circular configuration on platform 32. The purpose of the permanent magnet is to establish a stationary, uniform magnetic field for the generator.

In accordance with the present invention, the apparatus is provided with sensing means responsive to the magnetic field established by the permanent magnet for producing electrical energy in response to changes in the magnetic field. Preferably, the sensing means comprises one or more coils located within the magnetic field established by the permanent magnet. Referring to FIG. 1, a pair of coils 38 is mounted at the lower end of tube 34, e.g., by conventional bonding technique or other adhesive. Each coil consists of a plurality of turns of insulated wire and includes a set of leads 40 for electrical connection to an output circuit. The coils are arranged in a side-by-side configuration to respond to different portions of the magnetic flux from permanent magnet 36.

Further, in accordance with the invention, blocking means is interposed between the permanent magnet and the sensing means for periodically interrupting the magnetic field from the permanent magnet. Preferably, a magnetic field control device mounted for movement between the permanent magnet and sensing coil includes an element of diamagnetic material for shielding the sensing coil from the magnetic field upon interposition of the element between the magnet and the coil. In the preferred embodiment, the magnetic field control device comprises a rotatable blocking element of soft superconductive material rendered impermeable to the magnetic field at temperatures near absolute zero and adapted to alternately block and pass the magnetic field from the permanent magnet upon rotation of the blocking element to produce electrical energy in the coil.

Referring to FIGS. 1 and 2, a disc, generally 42, is rotatably mounted between permanent magnet 36 and sensing coils 38. The disc is attached at the lower end of a shaft 44 rotatably mounted within tube 34 by a plurality of sleeve bearings 45 provided at spaced locations in the tube. A magnetic control element 46, e.g., a piece of magnetized material such as alnico 8, is mounted on tube 34 to permit the demagnetizing effects of temperature and other conditions to be determined. The upper end of shaft 44 is connected through a coupling 47 to a motor 48 mounted on a circular platform 50 supported by a plurality of rods 52 extending upward from circular plate 24. Each rod 52 is provided with a threaded portion 54 at its upper end for receiving a pair of nuts 56 which are employed to clamp platform 50 to the rods.

Since tube 34 and shaft 44 provide a heat conductive path from the interior to the exterior of the low temperature vessel, it is contemplated that these components can be constructed to minimize the amount of heat transfer from the vessel. For example, the tube and shaft can be constructed of insulating material, e.g., a rigid plastic such as teflon, to minimize heat conduction. Further, it is contemplated that alternative pressure or magnetic coupling arrangements, which do not require mechanical connection between the motor and the disc, can be provided to eliminate the requirement of a continuous shaft extending from the interior to the exterior of the vessel.

Figure 3:
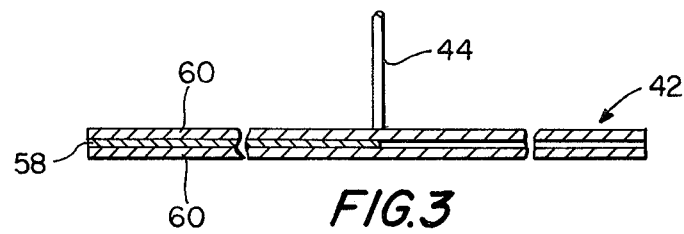
FIG. 3 is an enlarged side view, in section, of the superconductive blocking element.
Figure 4:
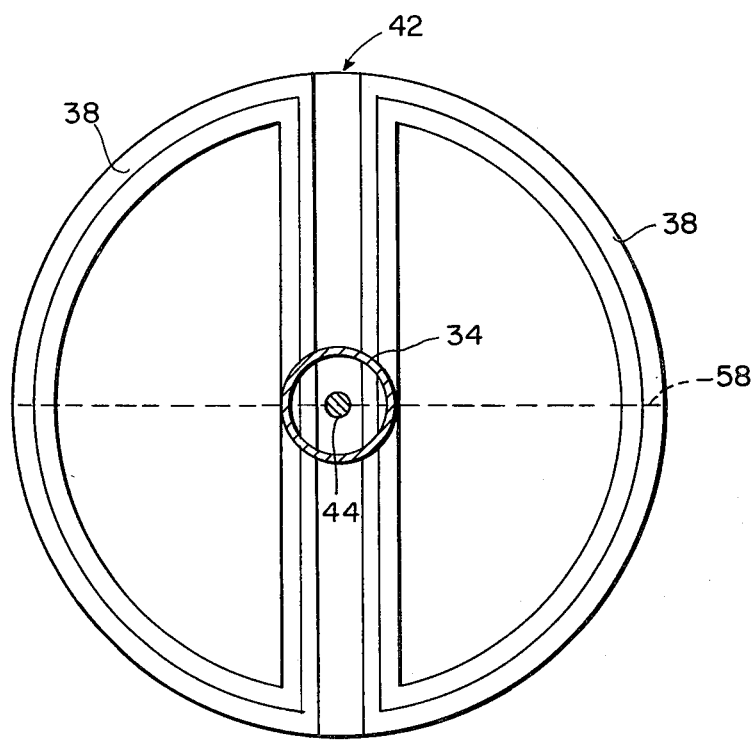
FIG. 4 is a plan view taken along line 4—4 of FIG. 2 illustrating the relationship of the sensing coils and superconductive blocking element.

Referring to FIGS. 3 and 4, the magnetic field control device consists of a thin, semi-circular element 58 of niobium placed between a pair of circular elements 60 of magnetically inert material. Alternatively, other soft superconductive material, e.g., mercury, lead, aluminum, vanadium, lanthanum, or technetium may be used in place of niobium, if desired. In addition, it is possible to employ hard superconductive materials with an appropriate adjustment in the magnetic field strength. Niobium element 58 and magnetically permeable elements 60 are held together by any suitable arrangement, e.g., bonding or adhesive tape. The resulting disc comprises a semi-circular portion of soft superconductive material (niobium) rendered impermeable to the magnetic flux at temperatures near absolute zero and a semi-circular portion of magnetically inert material. Disc 42 is located in a position relative to permanent magnet 36 to place superconductive element 58 at a magnetic field strength slightly below its critical field.

Alternatively, it is contemplated that mechanisms other than a superconductive blocking element can be used to provide a suitable magnetic field blocking device. For example, in the field of plasma physics, it is recognized that ionized gases known as plasmas exhibit the property of diamagnetism. Such materials, if confined in a suitable container, would be appropriate, in place of the soft superconductive material of the preferred embodiment, to provide a unit in which the magnetic field applied to the sensing coils is periodically interrupted. Of course, such a modified device would not require the low temperature medium of the preferred embodiment.

As shown in FIG. 2, a voltage supply circuit including a variable power supply 62 for converting conventional AC voltage to DC voltage provides a suitable DC voltage input for operating motor 48. A common current wattmeter 64 is connected across the AC input lines to the variable power supply to indicate the power consumption of the motor.

Figure 5:
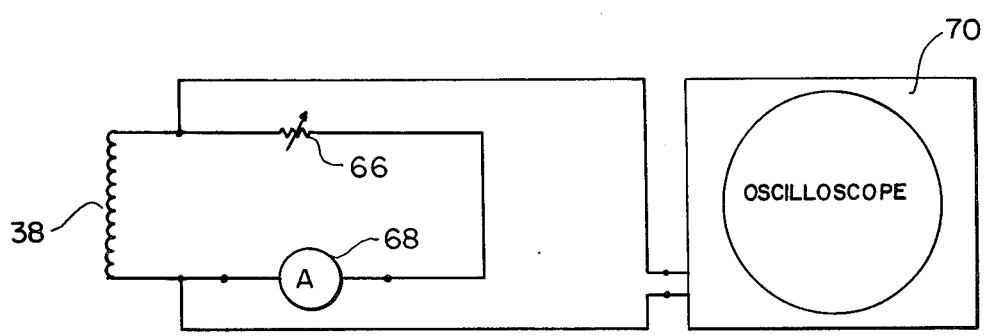
FIG. 5 illustrates an oscilloscope circuit used to measure the electrical power produced by the apparatus.

The circuit of FIG. 5 is used to determine the output power produced by the generator. This circuit includes a variable resistor 66 and an ammeter 68 which can be connected in series across either coil 38 of the generator. The resistance serves as a load and the ammeter measures the load current. In addition, an oscilloscope 70 is connected across the coil to measure the output voltage. The product of the load current and output voltage equals the output power.

In the operation of the apparatus, generator unit 20 is inserted into Dewar tank 22 with circular plate 24 resting on the upper edge of the tank. Liquid helium is applied to the interior of the tank up to the dashed line shown in FIG. 2 to cool the niobium element to a temperature near absolute zero. The position of disc 42 is set relative to magnet 36 by adjustment of platform 50 on rods 52 to locate niobium element 58 slightly above the position at which the flux density of the magnetic field renders the niobium element a normal conductor. At temperatures near absolute zero, niobium exhibits diamagnetism and the Meissner effect. Thus, when interposed between magnet 36 and either of the coils, niobium element 58 blocks the magnetic flux from the magnet to the coil.

When motor 48 is energized to rotate disc 42, niobium element 58 operates to alternately block and pass the magnetic flux from magnet 36 to coils 38. When niobium element 58 is located entirely below either coil, the coil is completely shielded from the magnetic flux. At the same time, the other coil is completely exposed to the magnetic flux. At all other times, each coil is partially shielded and partially exposed to the magnetic flux.

As a result of rotation of disc 42 and niobium element 58, each coil 38 is subjected to a continuously changing magnetic field. A voltage is induced in each coil which is proportional to the rate of change of the magnetic flux through the coil. When the coil is connected to an output circuit, such as the circuit of FIG. 5, the output power produced by the generator can be determined by measuring its output voltage and load current.

Example

In a specific example of a generator unit constructed according to the principles of the present invention, circular plate or cover 24 is made of aluminum six and three-quarter inches (6¾") in diameter and one inch (1") in thickness. It serves as a cover for Dewar tank 22 which has an inner diameter of five and three-quarter inches (5¾"). Support rods 26 comprise hollow stainless steel tubes with a wall thickness of 0.03 inch and an outer diameter of one-half inch (½"). Platform 32 is made of steel one-eight inch (⅛") in thickness and is provided with spaced holes (not shown) approximately one-half inch (½") in diameter to reduce its mass.

Tube 34 is made of stainless steel with an outer diameter of one and one-half inches (1½") and an inner diameter of 1.435 inches. Magnet 36 comprises a substantially circular assembly of bar magnets of alnico 8 material. The magnet has a maximum field strength of approximately 4800 gauss.

Each coil 38 consists of AWG #18 wire and includes approximately one hundred (100) turns. Each coil is substantially semi-circular in configuration with a radius of 2.25 inches, a height of 0.7 inch, and a depth of 0.2 inch.

Shaft 44 is made of stainless steel one-eighth inch (⅛") in diameter. Disc 42 attached to the lower end of shaft 44 includes semi-circular element 58 of niobium, approximately 0.001 inch in thickness and 99.84% pure, and two (2) circular elements 60 composed of cardboard. The disc is approximately four and one-half inches (4½") in diameter.

In a representative operation, the position of disc 42 was set by adjustment of the level of platform 50 to place the disc slightly above the flux density (approximately 2000 gauss) at which niobium element 58 behaves as a normal conductor. The disc was rotated at one thousand (1000) revolutions per minute and readings on each coil 38 were taken. The value of resistance 66 (FIG. 5) was varied. The wattage consumed by motor 48 was roughly 7 watt plus or minus 2.5 watts. The wattage output measured by the circuit of FIG. 5 was approximately 11.4 watts maximum. The $V_{RMS}$ of each coil was 1.14 volts plus or minus 0.5 volts. $V_{MAX}$ was 1.612 volts and $I_{RMS}$ was about 10 amps. Wattmeter readings were divided by the product of the oscilloscope and ammeter readings to determine the power factor which was very close to unity.

The generator unit of the present invention provides a highly efficient device for producing electrical energy from a magnetic field. It produces an enhanced electrical output in comparison with the input energy required to drive the unit. It is anticipated that a portion of the enhanced electrical output can be used for operation of the cooling apparatus to provide liquid helium and another portion of the electrical output can be used to provide input energy to drive the motor of the generator unit.

The invention in its broader aspects is not limited to the specific details shown and described, and modifications may be made in the details of the generator unit without departing from the principles of the present invention.

What is claimed is:
1. An apparatus for generating electrical energy comprising support means;
   a permanent magnet supported by a first portion of said support means and establishing a magnetic field;
   sensing means supported by a second portion of said support means and positioned adjacent said permanent magnet and normally within the magnetic field of said permanent magnet, said sensing means being operable in response to changes in the magnetic field to produce electrical energy;
   blocking means supported by a third portion of said support means, said blocking means being substantially impermeable to magnetic flux;
   means moving said sensing means and said blocking means relative to one another, whereby said block- ing means periodically shields the sensing means from the magnetic field and alternately shields and exposes the sensing means to the magnetic means and said field, whereby to produce electrical energy in said sensing means.

2. An apparatus as defined in claim 1, said blocking means including a super conductive member.

3. An apparatus for generating electrical energy comprising support mmeans;

a permenant magnet supported by a first portion of said support means and establishing a magnetic field;

sensing means supported by a second portion of said support means and positioned adjacent said permenant magnet and normally within the magnetic field of said permenant magnet, said sensing means being operable in response to changes in the magnetic field to produce electrical energy;

blocking means supported by a third portion of said support means, said blocking means being substantially impermeable to magnetic flux;

means causing said blocking means to periodically shield the sensing means from the magnetic field to alternately shield and expose the sensing means to the magnetic field, whereby to produce electrical energy in said sensing means.

* * * * *